Jan. 12, 1965　　　G. P. AUSBURN ETAL　　　3,165,124
LINE BLIND
Filed Nov. 9, 1962
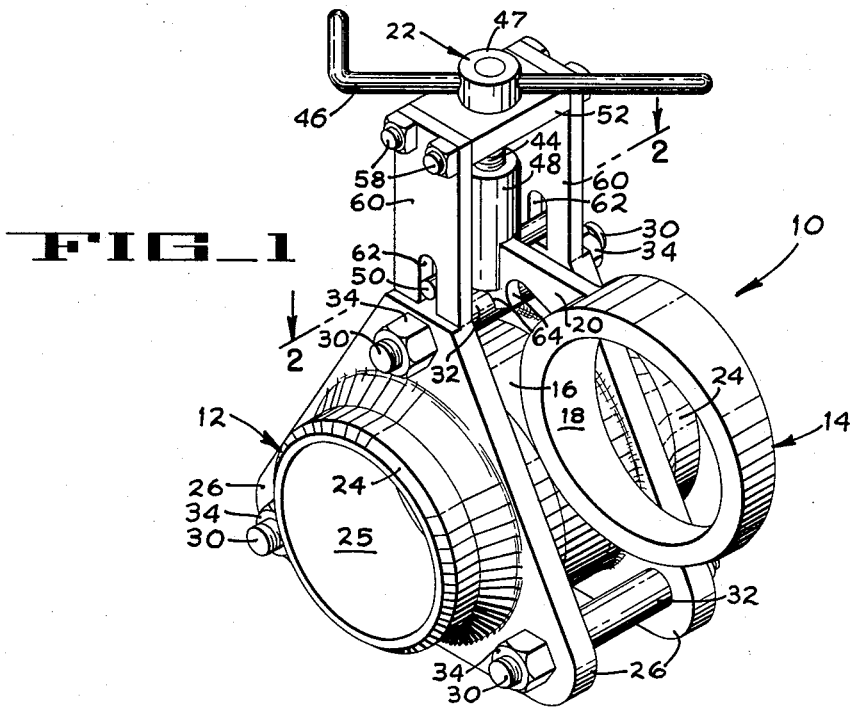
FIG_1
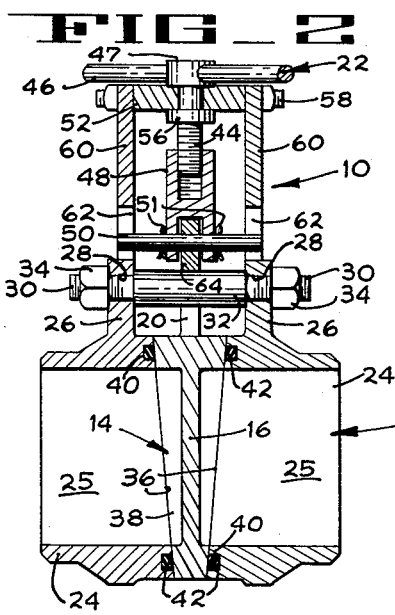
FIG_2
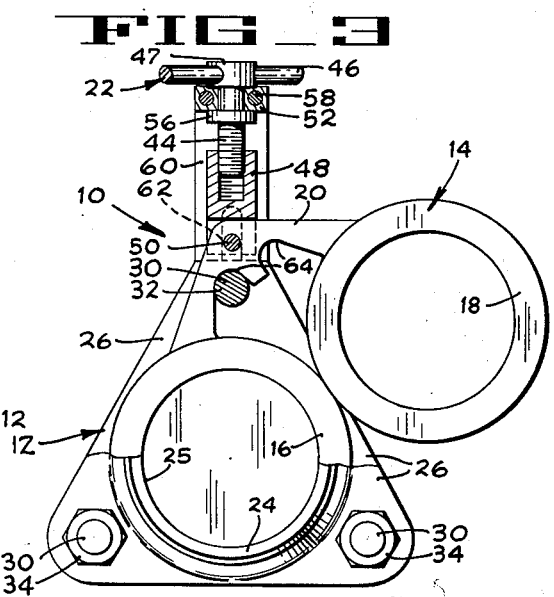
FIG_3
INVENTORS
GEORGE P. AUSBURN
WILLIAM M. PEARSON
BY Hans G. Hoffmeister
ATTORNEY 3,165,124
LINE BLIND
George P. Ausburn, Los Alamitos, and William M. Pearson, Long Beach, Calif., assignors to FMC Corporation, San Jose, Calif., a corporation of Delaware
Filed Nov. 9, 1962, Ser. No. 236,500
10 Claims. (Cl. 138—94.3)

The present invention pertains to flow control valves and more particularly relates to the line blind type of valve which utilizes what is commonly referred to as a spectacle plate insert. Such inserts are apertured at one side and blank at the other side, so that the open or shut condition of the valve is readily determined by observation of the visible side of the spectacle plate.

Prior constructions employed for line blinds have been complex, bulky and costly. Prior line blinds have required the use of intricate, uneconomical castings and an array of small components, which have made the blind expensive, and which have made repair or replacement of parts difficult and inconvenient.

Accordingly, one of the objects of the present invention is the provision of a low cost line blind which equals the efficiency and ruggedness attained by other line blinds, but which is characterized by extreme simplicity and an economy in the manufacture of component parts.

Another object of this invention is to provide a line blind which is effective in high pressure ranges and yet is light in weight and compact.

Another object of the invention is the provision of an easily dismantled line blind so as to expedite repairs or inspection of the blind.

These and other objects and advantages of the present invention will become apparent from the following description and the accompanying drawing, in which:

FIGURE 1 is a perspective of the line blind of the present invention.

FIGURE 2 is a central longitudinal section taken through the line blind structure shown in FIGURE 1.

FIGURE 3 is an end elevation of the line blind of the present invention, portions thereof being broken away.

The line blind 10 (FIG. 1) of the present invention includes a rigid two-part tubular body section 12 which is adapted for connection in a flow line to be controlled by the blind; a spectacle plate 14 having a closed side 16, an annular open side 18, and a web 20 interconnecting the two sides. The blind also includes a screw mechanism 22 for raising and lowering either side of the spectacle plate 14 to or from its operative position within the body section 12.

The body section 12 is formed of two spaced cast steel tubular body members 24, the outer ends of which are formed as welding necks which can be welded to the pipes in a flow line. Each tubular body member 24 has a cylindrical bore 25 (FIG. 2) and an integral tri-cornered radially projecting flange 26. An aperture 28 is provided near the apex of each corner of the flange 26, the two flanges being aligned for the reception of the threaded ends of shouldered bolts 30. Each bolt 30 has an enlarged body portion 32, the ends of which abut the inner face of the flanges 26, in order to secure the two flanges 26 in spaced relation. Nuts 34 are threaded on the ends of the bolts 30, and are drawn up tightly against the outer surfaces of the flanges 26 in order to secure together the tubular body members 24, to form the rigid body section 12 of the line blind.

The inner end wall 36 of each body portion 24 is inclined, in order to form, between the inclined end walls of the two flanges, a wedge-shaped valve chamber or seat 38, having planar walls converging toward the bottom of the blind. It will be noted that the two body portions 24 comprising the line blind body 12 are interchangeable, no individual configuration being necessary. Thus, a simplified and economical construction is achieved for the body section 12.

Each end wall 36 is provided with an annular groove 40 for the reception of a conventional O-ring seal 42, with the inwardly facing surface of the O-ring projecting beyond the plane of the end wall in which it is mounted.

Each side 16 and 18 of the spectacle plate 14 is wedge shaped in cross-section, so as to conform to the inclination of the body end walls 36, and each side of the spectacle plate is vertically movable into a seated and sealed position against the valve seat 38, after a manual alignment of the desired open or closed side of the spectacle plate with the valve seat.

In order to free whichever side of the spectacle plate is sealed against the valve seat 38, an axially fixed actuating rod 44 is rotated counterclockwise to lift the spectacle plate upwardly from the body 12. The rod 44 is rotated by means of a handle lever 46 mounted in a hub 47 at the upper end of the rod. The lower end portion of the actuating rod 44 has left-hand threads that are engaged with internal threads provided in a yoke 48. The yoke 48 is secured to the web 20 of the spectacle plate by means of a transverse pin 50, which extends through a bifurcated lower end of the link and through the web. Cotter pins 51 removably retain the pin 50 in the yoke 48, but provide for removal of the pin when the line blind is disassembled for inspection or repair.

The actuating rod 44 is axially located in a tie plate 52 by means of the hub 47 and a collar 56 which are respectively disposed above and below the tie plate 52. Bolts 58 extend through the tie plate and through two depending guide bars 60 that project upwardly from flanges 26 and abut the ends of the tie plate. The lower end of each bar 60 is welded to one of the radial flanges 26 and is slotted at 62 to receive one end of the pin 50.

The lower edge of the connecting web 20 of the spectacle plate 14 is provided with two spaced arcuate recesses 64 (FIG. 3), each of which lie on a diameter of one of the spectacle plate side portions 16 or 18. When the associated open or closed side of the spectacle plate is lowered to its sealed, operative position within the body 12, one of the recesses 64 fits over the body portion 32 of the uppermost tie bolt 30. Thus the upper tie bolt 30, in cooperation with one of the recesses 64, provides an indexing means that will correctly register the spectacle plate with the bores 25 during final lowering of the plate into the valve body 12. The parts are dimensioned so that the spectacle plate is in sealing engagement with the body 12 before the associated recess 64 bottoms on the body portion 32 of the tie bolt.

When the O-ring seals 42 require replacement, the spectacle plate is lifted out of engagement with the valve seat 38, and the cotter pins 51 are removed which hold the pin 50 in the yoke 48. The pin 50 is then slid out to uncouple the spectacle plate from the screw mechanism 22, after which the spectacle plate may be removed from valve body 12 to provide access to the O-rings 42.

From the foregoing description, and from the accompanying drawing, it is evident that the line blind structure of the present invention provides a simple, compact, and relatively lightweight valve structure which is capable of inexpensive manufacture and can be quickly and economically repaired or inspected. The line blind of the invention is of rugged construction, assuring long and trouble-free service.

While a particular embodiment of the present invention has been shown and described, it will be understood that the line blind of this invention is capable of modification and variation without departing from the principles of the invention and that the scope of the invention is determined by the appended claims.

The invention having thus been described, that which is believed to be new and for which protection by Letters Patent is desired is:

1. A line blind for controlling flow in a pipe line, comprising two spaced coaxial body portions having aligned flow passages and inclined confronting walls forming a valve seat, a plurality of tie bolts interconnecting said body portions and forming thereby a rigid valve body assembly, and a spectacle plate having a blind side and an apertured side for selective insertion into said valve seat, means forming a recess diametrically aligned with each side of said spectacle plate, each recess being positionable over one of said tie bolts for indexing the selected side of said spectacle plate with said valve seat.

2. A line blind for controlling flow in a pipe line comprising two coaxial spaced body portions having aligned flow passages and inclined confronting walls forming a valve seat, a plurality of tie bolts interconnecting said body portions and forming thereby a rigid valve body assembly, a spectacle plate having a blind side and an apertured side for selective insertion into said valve seat, a web portion interconnecting said spectacle plate sides, means forming a recess in said web portion diametrically with each side of said spectacle plate, each recess being positionable over one of said tie bolts upon movement of the spectacle plate toward a seated position to keep the selected side of the spectacle plate in transverse registry with the valve seat.

3. A line blind for controlling flow in a pipe line comprising two coaxial spaced body portions having aligned flow passages and inclined confronting walls forming a valve seat, a plurality of tie bolts interconnecting said body portions and forming thereby a rigid valve body assembly, a spectacle plate having a blind side and an apertured side for selective insertion into said valve seat, a screw mechanism mounted on said valve body and connected to said spectacle plate for seating and unseating a selected side of said spectacle plate in said valve seat, one of said tie bolts lying between said screw mechanism and said valve seat, a web portion interconnecting the sides of said spectacle plate, said web portion having formed therein a pair of recesses facing said one tie bolt, each recess being diametrically aligned with one side of said spectacle plate for fitting over said one tie bolt upon movement of the spectacle plate toward a seated position.

4. A line blind for controlling flow in a pipe line comprising a rigid valve body having aligned flow passages and confronting walls forming a double valve seat, a screw mechanism mounted on said valve body and having an actuating yoke movable toward and away from said valve seat, a spectacle plate with a blind side and an apertured side, a web interconnecting said sides and pivotally connected to said actuating yoke for swinging transverse movement of said spectacle plate and the selective insertion of either of said sides into said valve seat, a tie bolt mounted in said valve body between said pivotal web connection and said valve seat, and means forming a pair of recesses in said web portion and facing said tie bolt, each of said recesses being diametrically aligned with one side of said spectacle plate and engageable with said tie bolt for guiding the selected side of said spectacle plate into registration with said valve seat.

5. A line blind comprising two spaced coaxial body portions having aligned flow passages and confronting walls forming a valve seat, a plurality of spacer members interconnecting said body portions and forming thereof a rigid valve body assembly, a spectacle plate having circular end portions defining a blind side and an apertured side for selective insertion into engagement with said valve seat, and means forming a recess in said spectacle plate in radial alignment with each of said circular ends for indexing the selected side of said spectacle plate with said valve seat upon the positioning of a recess over one of said spacers.

6. In a line blind provided with a tubular body including opposite end portions having spaced confronting end walls that circumscribe flow passage means through the body; said spaced end walls defining a slot in the body; a spectacle plate including an imperforate portion, a portion having a port therein, and a web rigidly interconnecting said imperforate and ported portions; adjustment means mounted on said body for movement toward and away from said slot; and means pivoting said web on said adjustment means for alternatively positioning said imperforate and ported portions in said slot and passage means; the improvement of a rigid member rigidly mounted on the body between the slot and the web, said web having recesses individually located between the pivot axis of the plate and said imperforate and ported portions for fitting over and guiding said portions into closed and open positions, respectively, subsequent to their initial pivoting movement into the flow passage upon movement of the adjustment means toward the slot.

7. In a line blind provided with a tubular body including opposite end portions having spaced confronting end walls that circumscribe flow passage means through the body, said end walls defining a slot; a spectacle plate including perforate and imperforate portions and a web rigidly connected to said portions, said plate being mounted in the general plane of said slot for alternative positioning of said portions in said passage means; the improvement in said blind wherein said web projects outward from said portions in spaced relation to said slot, wherein a rigid member is rigidly mounted on the body between the slot and the web, and wherein said web includes means for individually guiding said perforate and imperforate portions into open and closed positions respectively, in said passage means upon movement of said web toward said rigid member.

8. The line blind of claim 7 wherein said end walls constitute a valve seat having a predetermined center, wherein each of said portions of the plate having a shape corresponding to the shape of the valve seat and are adapted to be concentric with the seat when in their respective open and closed positions, and wherein said rigid member and guiding means guide said portions into said concentric relationship upon forcing said web toward and against said rigid member.

9. In a line blind including a tubular body having flow passage means therethrough and a slot disposed transversely of said passage means; a spectacle plate disposed in the general plane of the slot and having perforate and imperforate portions alternatively positionable in the passage means; and separable interengageable guide means on the body and the spectacle plate for guiding each of said portions into its respective closed and open position in alignment with said flow passage means upon first locating said portion in said slot and then moving said portion in said slot transversely of said flow passage means.

10. The blind of claim 9 including means for moving the plate including the guide means thereon toward and away from the guide means on the body.

References Cited in the file of this patent

UNITED STATES PATENTS

| | | |
|---|---|---|
| 2,743,740 | Muff | May 1, 1956 |
| 2,781,787 | Johnson | Feb. 19, 1957 |
| 2,815,187 | Homer | Dec. 3, 1957 |
| 2,820,482 | Greenwood | Jan. 21, 1958 |
| 2,861,599 | Homer | Nov. 25, 1958 |